United States Patent
Deng

(10) Patent No.: US 12,488,427 B2
(45) Date of Patent: Dec. 2, 2025

(54) SHADOW ELIMINATION METHOD AND APPARATUS FOR TEXT IMAGE, AND ELECTRONIC DEVICE

(71) Applicant: CIENET TECHNOLOGIES (BEIJING) CO., LTD., Beijing (CN)

(72) Inventor: Yuance Deng, Beijing (CN)

(73) Assignee: CIENET TECHNOLOGIES (BEIJING) CO., LTD., Beijing (CN)

(*) Notice: Subject to any disclaimer, the term of this patent is extended or adjusted under 35 U.S.C. 154(b) by 302 days.

(21) Appl. No.: 18/446,446

(22) Filed: Aug. 8, 2023

(65) Prior Publication Data

US 2023/0386002 A1   Nov. 30, 2023

Related U.S. Application Data

(63) Continuation of application No. PCT/CN2022/074888, filed on Jan. 29, 2022.

(51) Int. Cl.
*G06T 5/50* (2006.01)
*G06T 5/40* (2006.01)
*G06T 5/75* (2024.01)
*G06T 7/136* (2017.01)
*G06T 7/194* (2017.01)

(52) U.S. Cl.
CPC ............... *G06T 5/50* (2013.01); *G06T 5/40* (2013.01); *G06T 5/75* (2024.01); *G06T 7/136* (2017.01); *G06T 7/194* (2017.01); *G06T 2207/20221* (2013.01); *G06T 2207/30176* (2013.01)

(58) Field of Classification Search
CPC .... G06T 5/50; G06T 5/75; G06T 5/40; G06T 7/136; G06T 7/194; G06T 2207/20221; G06T 2207/30176
USPC ........................................................ 382/171
See application file for complete search history.

(56) References Cited

U.S. PATENT DOCUMENTS

| | | | | | |
|---|---|---|---|---|---|
| 5,841,899 | A | * | 11/1998 | Ide | G06V 10/22 382/163 |
| 7,840,066 | B1 | * | 11/2010 | Chen | G06T 5/90 382/254 |
| 10,140,702 | B2 | * | 11/2018 | Sullivan | G06T 7/155 |

(Continued)

*Primary Examiner* — Allen H Nguyen
(74) *Attorney, Agent, or Firm* — George Guosheng Wang; Upstream Research and Patent LLC

(57) ABSTRACT

Disclosed are a shadow elimination method and apparatus for a text image, and an electronic device. The method comprises the following steps: converting a text image to be processed into a first grayscale image; performing convex height sorting processing on the first grayscale image to determine a background grayscale segmentation threshold of the first grayscale image and a text grayscale segmentation threshold within a shadow region of the first grayscale image; processing the background grayscale segmentation threshold and the text grayscale segmentation threshold to respectively obtain a shadow region mask representation and a non-shadow region mask representation; performing background enhancement on the first grayscale image to obtain a second grayscale image; and performing fusion processing on the shadow region having the background enhancement in the second grayscale image and the non-shadow region in the first grayscale image according to the shadow region mask representation and the non-shadow region mask representation.

14 Claims, 9 Drawing Sheets

(56) References Cited

U.S. PATENT DOCUMENTS

| | | | |
|---|---|---|---|
| 11,900,755 B1* | 2/2024 | Bueche, Jr. | G06T 7/194 |
| 2010/0183225 A1* | 7/2010 | Vantaram | G06T 7/168 |
| | | | 382/173 |

* cited by examiner

SHADOW ELIMINATION METHOD AND APPARATUS FOR TEXT IMAGE, AND ELECTRONIC DEVICE

BACKGROUND

Technical Field

The present disclosure relates to a method for eliminating a shadow of a text image and also relates to a corresponding apparatus for eliminating a shadow and an electronic device, and belongs to the technical field of image processing.

Related Art

With popularization of information technology and shooting equipment such as digital cameras and mobile phones, people often use shooting equipment such as mobile phones with shooting function, tablet personal computers or digital cameras to shoot text images (also known as character images, for example, books, newspapers, text printouts, and the like) at work or in life. Then the text images are directly stored or are shared with others by printing out the text images, and sending them via E-mails and instant messaging software, and the like, so that information sharing is further facilitated.

At present, in the shooting process by using shooting equipment, shot text images may be inconsistent in brightness and even have a wide range of shadows because of the shooting equipment itself or occlusion by other objects in some scenarios. Particularly at night, in a case where there is a single light source for illumination indoors, and the flashlight of the shooting equipment is not turned on, the shot text images will be inconsistent in brightness and will be occluded by shadows.

A typical case is shown in FIG. 1. The figure shows a text image obtained by shooting a text printout with the shooting equipment at night in a case where there is a single light source for illumination indoors. The effect obtained by directly printing the text image may be shown in FIG. 2 where the content of the part occluded by the shadow is lost completely. This kind of text image severely affects the reading effect when the text image is browsed and printed out. Partial information is lost as the text image cannot be identified.

SUMMARY

To solve the principle technical problem, the present disclosure is to provide a method for eliminating a shadow of a text image.

To solve another technical problem, the present disclosure is to provide an apparatus for eliminating a shadow of a text image and a corresponding electronic device.

To achieve the objects, the present disclosure adopts the following technical solution:

According to a first aspect of the embodiment of the present disclosure, provided is a method for eliminating a shadow of a text image, including the following steps:

converting a text image to be processed into a first grayscale image;

performing histogram statistics and convex height sequencing processing on the first grayscale image to determine a background grayscale segmentation threshold of the first grayscale image and a character grayscale segmentation threshold within a shadow area of the first grayscale image;

processing the background grayscale segmentation threshold and the character grayscale segmentation threshold to respectively acquire a mask representation of the shadow area and a mask representation of a non-shadow area;

performing background enhancement on the first grayscale image to obtain a second grayscale image; and performing fusion processing on the shadow area with the background enhancement in the second grayscale image and the non-shadow area in the first grayscale image according to the mask representation of the shadow area and the mask representation of the non-shadow area to acquire a text image without the shadow.

Preferably, before the step of converting a text image to be processed into a first grayscale image, the method includes the following steps:

acquiring at least one text image, and determining information of the shadow area of each text image; and screening out the text image to be processed from the at least one text image according to the information of the shadow area of each text image.

Preferably, the step of screening out the text image to be processed from the at least one text image according to the information of the shadow area of each text image includes the following sub step:

screening a text image with an area of the shadow area greater than a preset area threshold from the at least one text image as the text image to be processed according to the area of the shadow area of each text image.

Preferably, the step of screening out the text image to be processed from the at least one text image according to the information of the shadow area of each text image includes the following sub step:

screening a text image with an area proportion greater than a preset proportion threshold from the at least one text image as the text image to be processed according to the area proportion of the shadow area of each text image in the whole image.

Preferably, the step of performing histogram statistics and convex height sequencing processing on the first grayscale image to determine a background grayscale segmentation threshold of the first grayscale image and a character grayscale segmentation threshold within a shadow area of the first grayscale image includes the following sub steps:

performing histogram statistics on the first grayscale image;

calculating the convex height of each grayscale interval after histogram statistics, and sequencing the convex heights; and extracting n grayscale intervals with the maximum convex height, and determining the background grayscale segmentation threshold of the first grayscale image and the character grayscale segmentation threshold within the shadow area of the first grayscale image, where n is a preset positive integer.

Preferably, the step of performing histogram statistics on the first grayscale image includes the following sub steps:

performing distribution estimation on all elements in the first grayscale image by way of histogram statistics to form a distribution estimation sequence $\overline{\lambda}$, and determining a distribution probability density $\lambda_k$ corresponding to each element in the distribution estimation sequence $\overline{\lambda}$, where $$\lambda_k = \frac{\theta_k}{\Theta};$$

where $\lambda_k$ is the distribution probability density corresponding to the $k^{th}$ element of the distribution estimation sequence $\overline{\lambda}$; $\theta_k$ is a value falling into an interval $[(k-1)*\rho, k*\rho]$; $\Theta$ is the number of elements of the first grayscale image; and $\rho$ is a statistical interval, $\rho=255/Z$, and $Z$ is the total number of preset statistical intervals;

acquiring a first-order difference symbol sequence $\overline{\lambda}^{1D}$ by using a first-order difference and symbol judgment method according to the distribution probability density $\lambda_k$ corresponding to each element, where $\lambda_i^{1D}$ is the $i^{th}$ element of $\overline{\lambda}^{1D}$, and 1D represents first-order difference; where; and $$\lambda_i^{1D} = \begin{cases} 1 & \text{if } \lambda_{i+1} > \lambda_i \\ 0 & \text{if } \lambda_{i+1} = \lambda_i \quad 0 \leq i \leq Z-2 \\ -1 & \text{if } \lambda_{i+1} < \lambda_i \end{cases}$$

calculating a second-order difference extremum marking sequence $\overline{\lambda}^{2D}$ according to an element $\lambda_i^{1D}$ in $\overline{\lambda}^{1D}$, where $\lambda_j^{2D}$ is the $j^{th}$ element of $\overline{\lambda}^{2D}$; and 2D represents second-order difference; where $$\lambda_j^{2D} = \begin{cases} 1 & \text{if } \lambda_{j+1}^{1D} - \lambda_j^{1D} < 0 \\ 0 & \text{otherwise} \end{cases}.$$

Preferably, the step of calculating the convex height of each grayscale interval after histogram statistics, and sequencing the convex heights includes the following sub steps:

determining a convex height sequence H corresponding to the distribution estimation sequence $\overline{\lambda}$, where the length of the convex height sequence H is identical to the second-order difference extremum marking sequence $\overline{\lambda}^{2D}$ of the distribution estimation sequence $\overline{\lambda}$, and in a position where the sequence $\overline{\lambda}^{2D}$ is zero, a value corresponding to the convex height sequence H is zero, too;

calculating a convex interval and the convex height corresponding to an element $\overline{\lambda}$ at a non-zero position of the second-order difference extremum marking sequence in the distribution estimation sequence $\overline{\lambda}$, where calculation of the convex interval includes calculation of a left convex interval and a right convex interval; the left convex interval is a position from an extremum position to the last higher extremum or a signal initial position; and the right convex interval is a position from the extremum position to a next higher extremum or a signal end position;

for the element $\lambda_t$ with the value of the second-order difference extremum marking sequence at the corresponding position of the element being non-zero, $0 \leq t \leq Z-2$, calculation modes of the initial position a $\alpha_L$ of the left convex interval and the end position $\alpha_R$ of the right convex interval are as follows:

$$\alpha_L = \begin{cases} \arg_{\varphi_L}^{min}|\varphi_L - t| & \text{if } \exists \varphi_L \in [0, t), \text{ and } \lambda_{\varphi_L} > \lambda_t \\ 0 & \text{otherwise} \end{cases}$$

-continued
$$\alpha_R = \begin{cases} \arg_{\varphi_R}^{min}|\varphi_R - t| & \text{if } \exists \varphi_R \in (t, Z-2], \text{ and } \lambda_{\varphi_R} > \lambda_t \\ Z-2 & \text{otherwise} \end{cases};$$

determining the left convex interval and the right convex interval of the element $\lambda_t$ as $[\alpha_L, t]$ and $[t, \alpha_R]$;

calculating the greater value of the minimum values within the left convex interval and the right convex interval as a reference point $\lambda_{ref}$ of the convex height:

$$\lambda_{ref} = \max\left(\min\left(\bigwedge_{h=\alpha_L}^{t-1} \lambda_h\right), \min\left(\bigwedge_{h=t+1}^{\alpha_R} \lambda_h\right)\right)$$

where an operator $\min(\Lambda_a^b \psi)$ is to solve the minimum value of the sequence $\psi$ in the interval $[a, b]$;

determining the convex height corresponding to the element $\lambda_t$:

$$H_t = \lambda_t - \lambda_{ref}$$

and sequencing the convex height sequence H.

Preferably, the step of extracting n grayscale intervals with the maximum convex height, and determining the background grayscale segmentation threshold of the first grayscale image and the character grayscale segmentation threshold within the shadow area of the first grayscale image includes the following sub step:

extracting n elements from the greatest to the least from the convex height sequence H, with corresponding indexes being $\{\tau_0, \tau_1, \tau_2, \ldots, \tau_{n-1}\}$ in sequence, respectively extracting values at the corresponding positions of the distribution estimation sequence $\overline{\lambda}$, and determining the background grayscale segmentation threshold $\mu_b$ of the first grayscale image and the character grayscale segmentation threshold $\mu_{st}$ within the shadow area of the first grayscale image; where $$\begin{cases} \mu_b = \lambda_{\tau_0} - \Delta \\ \mu_{st} = \lambda_{\tau_{n-1}} + \Delta \end{cases}$$

and where $\Delta$ is a preset offset of the segmentation threshold.

Preferably, the step of performing background enhancement on the first grayscale image to obtain a second grayscale image includes the following substep:

determining a second grayscale image $D_{st}^g$ with the background enhancement and characters reserved in the shadow area, where $$d_{st,(i,j)}^g = \begin{cases} \lambda_{\tau_0} & \text{if } d_{(i,j)}^g > \mu_{st} \\ d_{(i,j)}^g & \text{otherwise} \end{cases}$$

and where $d_{st,(i,j)}^g$ and $d_{(i,j)}^g$ are respectively elements in the $i^{th}$ row and $j^{th}$ column of the second grayscale image $D_{st}^g$ and the first grayscale image $D^g$.

Preferably, the method for eliminating a shadow further includes the following substep:

performing shadow boundary enhancement on the first grayscale image to obtain a third grayscale image $D_b^g$, where $$d_{b,(i,j)}^g = \begin{cases} 0 & \text{if } d_{(i,j)}^g < \mu_b \\ d_{(i,j)}^g & \text{otherwise} \end{cases}$$

and where $d_{b,(i,j)}^g$ is the element in the $i^{th}$ row and $j^{th}$ column of the third grayscale image $D_b^g$.

Preferably, the step of processing the background grayscale segmentation threshold and the character grayscale segmentation threshold to respectively acquire a mask representation of the shadow area and a mask representation of a non-shadow area includes the following sub steps:

performing smooth filtering processing of a spatial domain on the third grayscale image, and then performing binarization processing to obtain the mask representation of the non-shadow area; and turning the grayscale value of the mask representation of the non-shadow area to acquire the mask representation of the shadow area.

Preferably, the step of performing fusion processing on the shadow area with the background enhancement in the second grayscale image and the non-shadow area in the first grayscale image according to the mask representation of the shadow area and the mask representation of the non-shadow area to acquire a text image without the shadow includes the following sub step:

performing fusion processing on the shadow area with the background enhancement in the second grayscale image and the non-shadow area in the first grayscale image to acquire the text image without the shadow.

According to a second aspect of the embodiment of the present disclosure, provided is an apparatus for eliminating a shadow of a text image, including:

a grayscale image conversion unit, configured to convert a text image to be processed into a first grayscale image;

a grayscale segmentation threshold determination unit, configured to perform histogram statistics and convex height sequencing processing on the first grayscale image to determine a background grayscale segmentation threshold of the first grayscale image and a character grayscale segmentation threshold within a shadow area of the first grayscale image;

a mask representation determination unit, configured to process the background grayscale segmentation threshold and the character grayscale segmentation threshold to respectively acquire a mask representation of the shadow area and a mask representation of a non-shadow area;

a background enhancement unit, configured to perform background enhancement on the first grayscale image to obtain a second grayscale image; and an area fusion unit, configured to perform fusion processing on the shadow area with the background enhancement in the second grayscale image and the non-shadow area in the first grayscale image according to the mask representation of the shadow area and the mask representation of the non-shadow area to acquire a text image without the shadow.

According to a third aspect of the embodiment of the present disclosure, provided is an electronic device, including a processor and a memory, where the processor is coupled with the memory to execute a program or an instruction in the memory, such that the electronic device implements the method in the above first aspect.

According to a fourth aspect of the embodiment of the present disclosure, provided is a computer readable storage medium, having an instruction stored therein. When the instruction runs on a computer, it enables the computer to implement the method in the above first aspect.

According to a fifth aspect of the embodiment of the present disclosure, provided is a computer program product including an instruction. When the computer program product runs on a computer, it enables the computer to implement the method in the above first aspect.

Compared with the prior art, the method provided by the present disclosure includes the following steps: converting a text image to be processed into a first grayscale image; performing histogram statistics and convex height sequencing processing on the first grayscale image to determine a background grayscale segmentation threshold of the first grayscale image and a character grayscale segmentation threshold within a shadow area of the first grayscale image; processing the background grayscale segmentation threshold and the character grayscale segmentation threshold to respectively acquire a mask representation of the shadow area and a mask representation of a non-shadow area; performing background enhancement on the first grayscale image to obtain a second grayscale image; and performing fusion processing on the shadow area with the background enhancement in the second grayscale image and the non-shadow area in the first grayscale image according to the mask representation of the shadow area and the mask representation of the non-shadow area to acquire a text image without the shadow. According to the embodiment of the present disclosure, the text image without the shadow may be acquired, and a condition that the partial content of the text image occluded by the shadow is lost completely is avoided, so that the reading effect when the text image is browsed or printed out is improved.

DETAILED DESCRIPTION

The technical content of the present disclosure will be further described in detail below in combination with drawings and specific embodiments.

It is to be emphasized first that the text image in the present disclosure is not limited to the narrow literally expressed meaning, and includes, but not limited to, images with various information such as characters, symbols and numbers. Images with inconsistent brightness, shadow occlusion, and the like all are applicable to the method for eliminating a shadow provided by the present disclosure.

Figure 3:
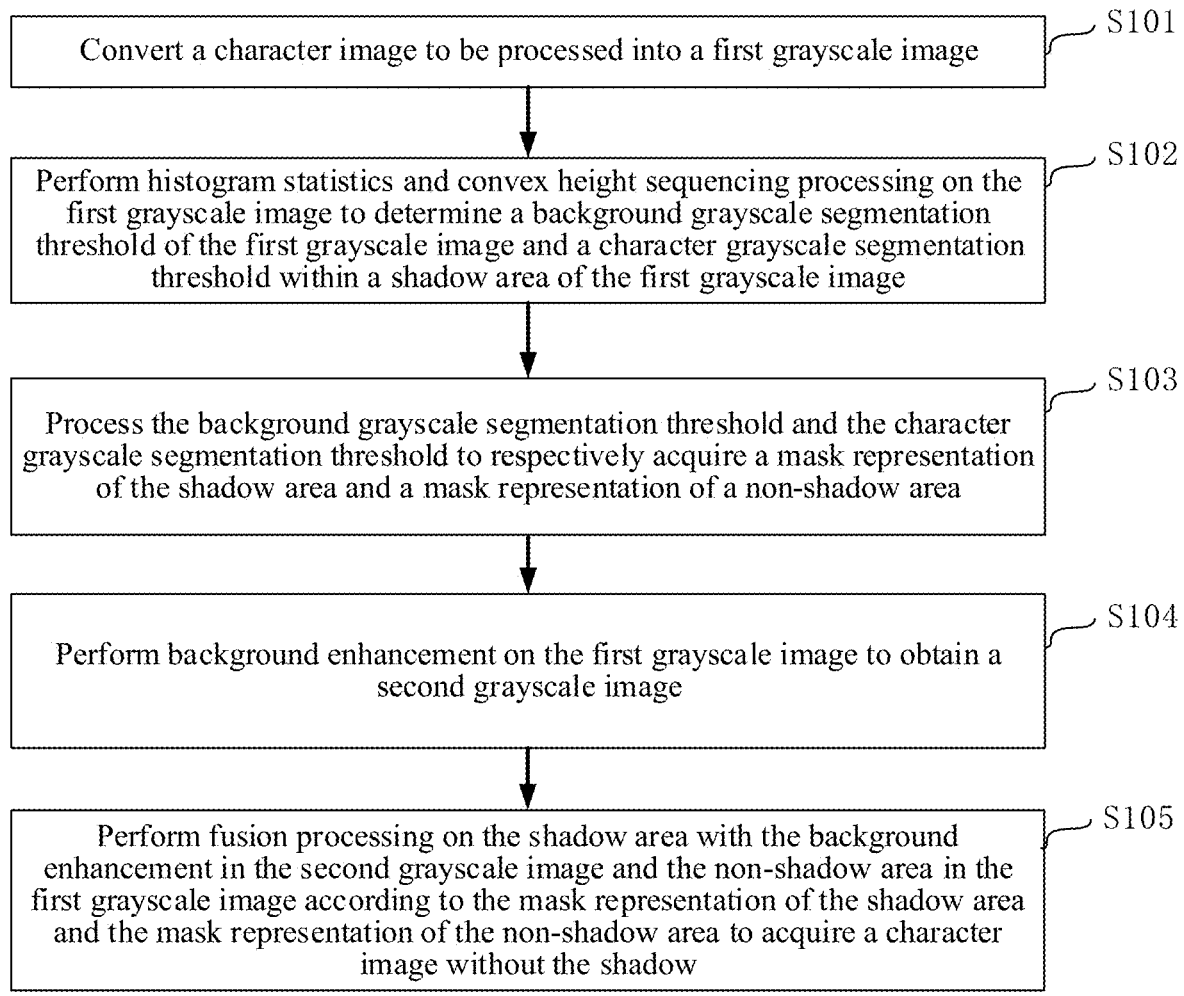
FIG. 3 is a flowchart I of a method for eliminating a shadow of a text image provided by an embodiment of the present disclosure.

To avoid a block of shadow in the obtained image in case of shadow occlusion to affect the quality of the final image when the image is shot with the shooting equipment, and particularly, to avoid a condition that the image is poor in definition and even graphs, characters, and the like are lost when the image is browsed on an electronic device and is printed, as shown in FIG. 3, the embodiments of the present disclosure first provide a method for eliminating a shadow of a text image, at least including the following steps:

Step S101: a text image to be processed is converted into a first grayscale image;

Step S102: histogram statistics and convex height sequencing processing are performed on the first grayscale image to determine a background grayscale segmentation threshold of the first grayscale image and a character grayscale segmentation threshold within a shadow area of the first grayscale image;

Step S103: the background grayscale segmentation threshold and the character grayscale segmentation threshold are processed to respectively acquire a mask representation of the shadow area and a mask representation of a non-shadow area;

Step S104: background enhancement is performed on the first grayscale image to obtain a second grayscale image; and Step S105: fusion processing is performed on the shadow area with the background enhancement in the second grayscale image and the non-shadow area in the first grayscale image according to the mask representation of the shadow area and the mask representation of the non-shadow area to acquire a text image without the shadow.

Figure 4:
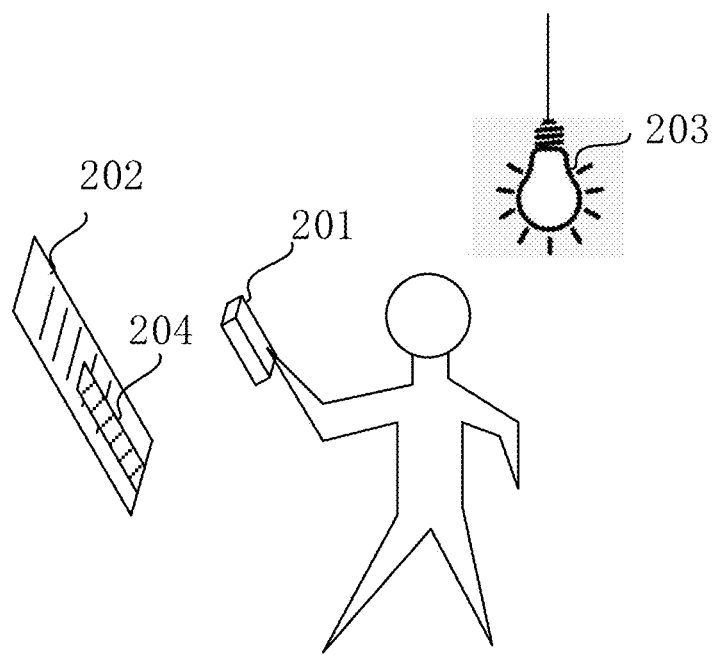
FIG. 4 is a schematic diagram of an application environment in an embodiment of the present disclosure.

To make those skilled in the art better understand the present disclosure, a more detailed embodiment will be enumerated below in combination with a specific application environment. As shown in FIG. 4, a user holds a mobile phone 201 in hand to shoot a document 202. However, the user turns his/her back to a light source 203. Therefore, the mobile phone 201 of the user blocks the light source 203, so a shadow 204 generated by the mobile phone 201 emerges on the document 202. The embodiment shown in FIG. 5 is to provide a method for eliminating a shadow of a text image for a scenario shown in FIG. 4.

Figure 5:
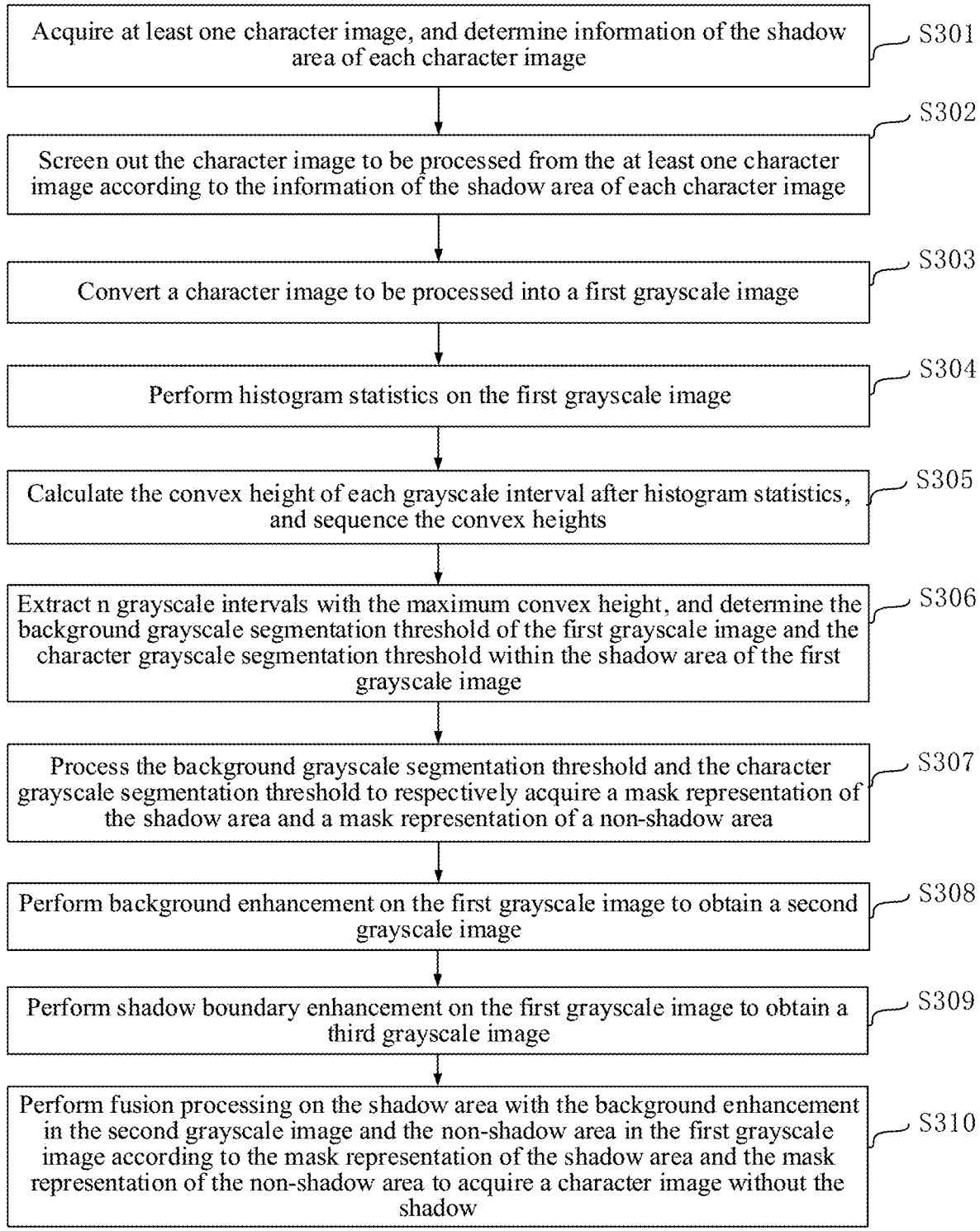
FIG. 5 is a flowchart II of a method for eliminating a shadow of a text image provided by an embodiment of the present disclosure.

Here, as shown in FIG. 5, the embodiment of the present disclosure further provides a method for eliminating a shadow of a text image, including the following steps:

Step S301: at least one text image is acquired, and information of the shadow area of each text image is determined.

Here, it shall be noted that the electronic device for implementing the method for eliminating a shadow of a text image may be either an image acquisition apparatus such as a mobile phone and a camera or a back end processing apparatus such as a computer for processing images and a server, but is not limited thereto. The step of determining the information of the shadow area of each text image may be implemented by the grayscale information of the text image. Under a normal circumstance, if there is no shadow area in the text image, grayscale distribution of the whole image is mainly focused on two parts with a great difference in grayscale value. The area with the greater grayscale value is a background area, and the area with the less grayscale value is a character area. When the grayscale distribution is obviously focused on a plurality of parts, it may be determined that there is the shadow area in the text image.

Step S302: the text image to be processed is screened out from the at least one text image according to the information of the shadow area of each text image.

Here, the Step S302 may be implemented in any way as follows, for example:

a text image with an area of the shadow area greater than a preset area threshold is screened from the at least one text image as the text image to be processed according to the area of the shadow area of each text image. That is, when the area of the shadow area of a certain text image is smaller (for example, less than the area threshold), the smaller shadow area may not affect browsing and printing of character information, so it is unnecessary to process the shadow area. When the area of the shadow area of a certain text image is larger (for example, greater than the area threshold), the larger shadow area may affect browsing and printing of character information, so the text image is taken as the text image to be processed. Thus, the problem of wasting computing resources by processing text images of all amounts can be avoided.

Or, a text image with an area proportion greater than a preset proportion threshold is screened from the at least one text image as the text image to be processed according to the area proportion of the shadow area of each text image in the whole image. That is, when the area of the shadow area of a certain text image is smaller (for example, the area proportion of the shadow area in the whole image is less than the proportion threshold), the smaller shadow area may not affect browsing and printing of character information, so it is unnecessary to process the shadow area. When the area of the shadow area of a certain text image is larger (for example, the area proportion of the shadow area in the whole image is greater than the proportion threshold), the larger shadow area may affect browsing and printing of character information, so the text image is taken as the text image to be processed. Thus, the problem of wasting computing resources by processing text images of all amounts can be avoided.

Step S303: a text image to be processed is converted into a first grayscale image.

Here, the Step S303 may be implemented in the following way, for example:

First, the text image to be processed is $D^o$, and under a normal circumstance, the dimensionality of a data matrix $D^o$ corresponding to the text image to be processed is m×n×3, where m and n are respectively numbers of pixel points corresponding to the height and width of the image. Generally speaking, the text image to be processed $D^o$ is represented by data of r/g/b color channels, with the dimensionality of all the color channels being m×n. A color image is converted into the first grayscale image according to the following equation:

$$D^g = 0.2989*R + 0.5870*G 0.1140*B$$

where R, G and B are red, green and blue components in the original color image $D^o$, and the relationship between each element value in the matrix and the original color image is as follows:

$$\begin{cases} r_{(i,j)} = D^o(i, j, 1) \\ g_{(i,j)} = D^o(i, j, 2) \\ b_{(i,j)} = D^o(i, j, 3) \end{cases}$$

where $r_{(i,j)}$, $g_{(i,j)}$ and $b_{(i,j)}$ respectively represent elements in the $i^{th}$ row and the $j^{th}$ column in the matrix R/G/B.

Step S304: histogram statistics is performed on the first grayscale image.

Here, the Step S304 may be implemented in the following ways:

distribution estimation is performed on all elements in the first grayscale image by way of histogram statistics to form a distribution estimation sequence $\bar{\lambda}$, and a distribution probability density $\lambda_k$ corresponding to each element in the distribution estimation sequence $\bar{\lambda}$ is determined, where $$\lambda_k = \frac{\theta_k}{\Theta};$$

where $\lambda_k$ is the distribution probability density corresponding to the kth element of the distribution estimation sequence $\bar{\lambda}$; $\theta_k$ is a value falling into an interval $[(k-1)*\rho, k*\rho]$; $\Theta$ is the number of elements of the first grayscale image $D^g$, satisfying $\Theta=m \times n$; and $\rho$ is a statistical interval, $\rho=255/Z$, and Z is the total number of preset statistical intervals, for example, it may be 125;

a first-order difference symbol sequence $\bar{\lambda}^{1D}$ is acquired by using a first-order difference and symbol judgment method according to the distribution probability density $\lambda_k$ corresponding to each element, where $\lambda_i^{1D}$ is the $i^{th}$ element of $\bar{\lambda}^{1D}$; where $$\lambda_i^{1D} = \begin{cases} 1 & \text{if } \lambda_{i+1} > \lambda_i \\ 0 & \text{if } \lambda_{i+1} = \lambda_i \quad 0 \le i \le Z-2 \\ -1 & \text{if } \lambda_{i+1} < \lambda_i \end{cases}$$

a second-order difference extremum marking sequence $\bar{\lambda}^{2D}$ is calculated according to an element $\lambda_i^{1D}$ in $\bar{\lambda}^{1D}$, where $\lambda_j^{2D}$ is the $j^{th}$ element of $\bar{\lambda}^{2D}$; where $$\lambda_j^{2D} = \begin{cases} 1 & \text{if } \lambda_{j+1}^{1D} - \lambda_j^{1D} < 0 \\ 0 & \text{otherwise} \end{cases}.$$

Step S305: the convex height of each grayscale interval is calculated after histogram statistics, and the convex heights are sequenced.

Here, the Step S305 may be implemented in the following ways:

a convex height sequence H corresponding to the distribution estimation sequence $\bar{\lambda}$ is determined, where the length of the convex height sequence H is identical to the second-order difference extremum marking sequence $\bar{\lambda}^{2D}$ of the distribution estimation sequence $\bar{\lambda}$, and in a position where the sequence $\bar{\lambda}^{2D}$ is zero, a value corresponding to the convex height sequence H is zero, too;

a convex interval and the convex height corresponding to an element $\bar{\lambda}$ at a non-zero position of the second-order difference extremum marking sequence in the distribution estimation sequence $\bar{\lambda}$ is calculated, where calculation of the convex interval includes calculation of a left convex interval and a right convex interval; the left convex interval is a position from an extremum position to the last higher extremum or a signal initial position; and the right convex interval is a position from the extremum position to a next higher extremum or a signal end position;

for the element $\lambda_t$ with the value of the second-order difference extremum marking sequence at the corresponding position of the element being non-zero, $0 \le t \le Z-2$, calculation modes of the initial position a $\alpha_L$ of the left convex interval and the end position $\alpha_R$ of the right convex interval are as follows:

$$\alpha_L = \begin{cases} \arg^{min}_{\varphi_L} |\varphi_L - t| & \text{if } \exists \varphi_L \in [0, t), \text{ and } \lambda_{\varphi_L} > \lambda_t \\ 0 & \text{otherwise} \end{cases}$$

$$\alpha_R = \begin{cases} \arg^{min}_{\varphi_R} |\varphi_R - t| & \text{if } \exists \varphi_R \in (t, Z-2], \text{ and } \lambda_{\varphi_R} > \lambda_t \\ Z-2 & \text{otherwise} \end{cases}$$

the left convex interval and the right convex interval of the element $\lambda_t$ with the value of the second-order difference extremum marking sequence at the corresponding position of the element being non-zero are determined as $[\mathbf{60}_L, t]$ and $[t, \alpha_R]$, respectively;

the greater value of the minimum values within the left convex interval and the right convex interval is calculated and taken as a reference point $\lambda_{ref}$ of the convex height:

$$\lambda_{ref} = \max\left(\min\left(\bigwedge_{h=\alpha_L}^{t-1} \lambda_h\right), \min\left(\bigwedge_{h=t+1}^{\alpha_R} \lambda_h\right)\right)$$

where an operator $\min(\wedge_a^b \psi)$ is to solve the minimum value of the sequence $\psi$ in the interval $[a, b]$;

the convex height corresponding to the element $\lambda_t$ is determined as:

$$H_t = \lambda_t - \lambda_{ref}$$

and the convex height sequence H is sequenced.

Step S306: n grayscale intervals with the maximum convex height are extracted, and the background grayscale segmentation threshold of the first grayscale image and the character grayscale segmentation threshold within the shadow area of the first grayscale image are determined.

n is a preset positive integer, it is recommended that the value of n is 4, and of course, the value of n may be 3 or 5, and the like as well.

Here, the Step S306 may be implemented in the following way:

n elements are extracted from the greatest to the least from the convex height sequence H, with corresponding indexes being $\{\tau_0, \tau_1, \tau_2, \ldots, \tau_{n-1}\}$ in sequence, for example, when n=4, the corresponding indexes are $\{\tau_0, \tau_1, \tau_2, \tau_3\}$ in sequence; respectively values at the corresponding positions of the distribution estimation sequence $\bar{\lambda}$ are extracted, and the background grayscale segmentation threshold $\mu_b$ of the first grayscale image and the character grayscale segmentation threshold $\mu_{st}$ within the shadow area of the first grayscale image are determined; where $$\begin{cases} \mu_b = \lambda_{\tau_0} - \Delta \\ \mu_{st} = \lambda_{\tau_{n-1}} + \Delta \end{cases}$$

and where Δ is a preset offset of the segmentation threshold, and is an adjustable parameter, for example, the value of it may be 50.

Step S307: the background grayscale segmentation threshold and the character grayscale segmentation threshold are processed to respectively acquire a mask representation of the shadow area and a mask representation of a non-shadow area.

Here, the Step S307 may be implemented in the following ways:

to acquire a smoother shadow area, smooth filtering processing of a spatial domain is performed on the third grayscale image $D_b{}^g$, and then binarization processing to obtain the mask representation $M_b{}^g$ of the non-shadow area is performed; where $$M_b{}^g = \mathcal{B}\{D_b{}^g \otimes P\}$$

and where ⊗ is a two-dimensional convolution operator; P is a filter coefficient of preset spatial filtering, with the dimensionality being σ×ω, and is mainly used in the embodiment of the present disclosure to smooth edges and eliminate the grayscale peak of an "island" in the area, so a normalized unit matrix may be usually used, i.e., the unit matrix needs to multiply by 1/(σ×ω). The dimensionality of the filter coefficient matrix is an adjustable parameter, σ=ω=10 is usually used in the embodiment of the present disclosure, and $\mathcal{B}\{\cdot\}$ is an image binaryzation operator; and the grayscale value of the mask representation $M_b{}^g$ of the non-shadow area is turned to acquire the mask representation $M_{st}{}^g$ of the shadow area, where $$M_{st}{}^g = 1 = M_b{}^g$$

and where 1 represents the unit matrix identical to $M_b{}^g$ in dimensionality.

Step S308: background enhancement is performed on the first grayscale image to obtain a second grayscale image.

Here, the Step S308 may be implemented in the following way:

determining a second grayscale image $D_{st}{}^g$ with the background enhancement and characters reserved in the shadow area, where $$d_{st,(i,j)}^g = \begin{cases} \lambda_{\tau_0} & \text{if } d_{(i,j)}^g > \mu_{st} \\ d_{(i,j)}^g & \text{otherwise} \end{cases}$$

and where $d_{st,(i,j)}{}^g$ and $d_{(i,j)}{}^g$ are respectively elements in the $i^{th}$ row and $j^{th}$ column of the second grayscale image $D_{st}{}^g$ and the first grayscale image $D^g$.

Step S309: shadow boundary enhancement is performed on the first grayscale image to obtain a third grayscale image $D_b{}^g$, where $$d_{b,(i,j)}^g = \begin{cases} 0 & \text{if } d_{(i,j)}^g < \mu_b \\ d_{(i,j)}^g & \text{otherwise} \end{cases}$$

and where $d_{b,(i,j)}{}^g$ is the element in the $i^{th}$ row and $j^{th}$ column of the third grayscale image $D_b{}^g$.

Step S310: fusion processing is performed on the shadow area with the background enhancement in the second grayscale image and the non-shadow area in the first grayscale image according to the mask representation of the shadow area and the mask representation of the non-shadow area to acquire a text image without the shadow.

Here, the Step S310 may be implemented in the following way:

fusion processing is performed on the shadow area with the background enhancement in the second grayscale image and the non-shadow area in the first grayscale image to acquire the text image $D_r{}^g$ without the shadow; where $$D_r{}^g = \mathcal{B}\{D_{st}{}^g * M_{st}{}^g + D^g * M_b{}^g\}.$$

Figure 1:
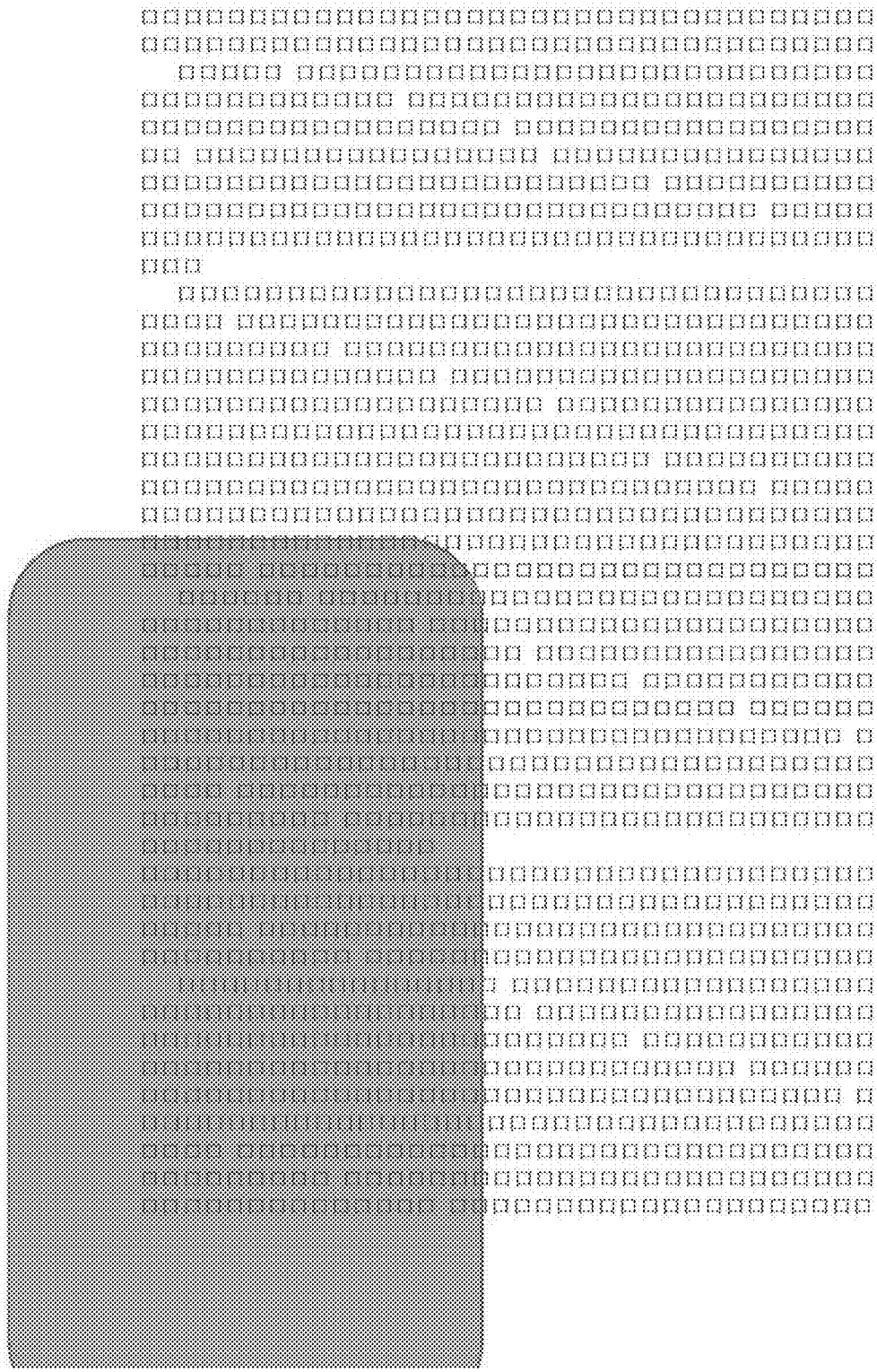
FIG. 1 is a schematic diagram of an image obtained by shooting a document with shooting equipment in the prior art.
Figure 2:
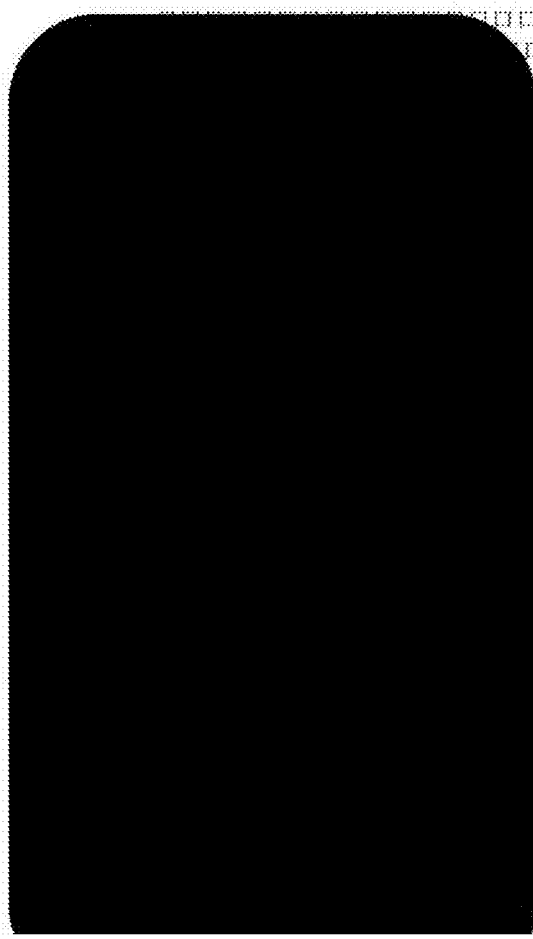
FIG. 2 is a schematic diagram of an effect of the printed image obtained by shooting the document with shooting equipment in the prior art.
Figure 6:
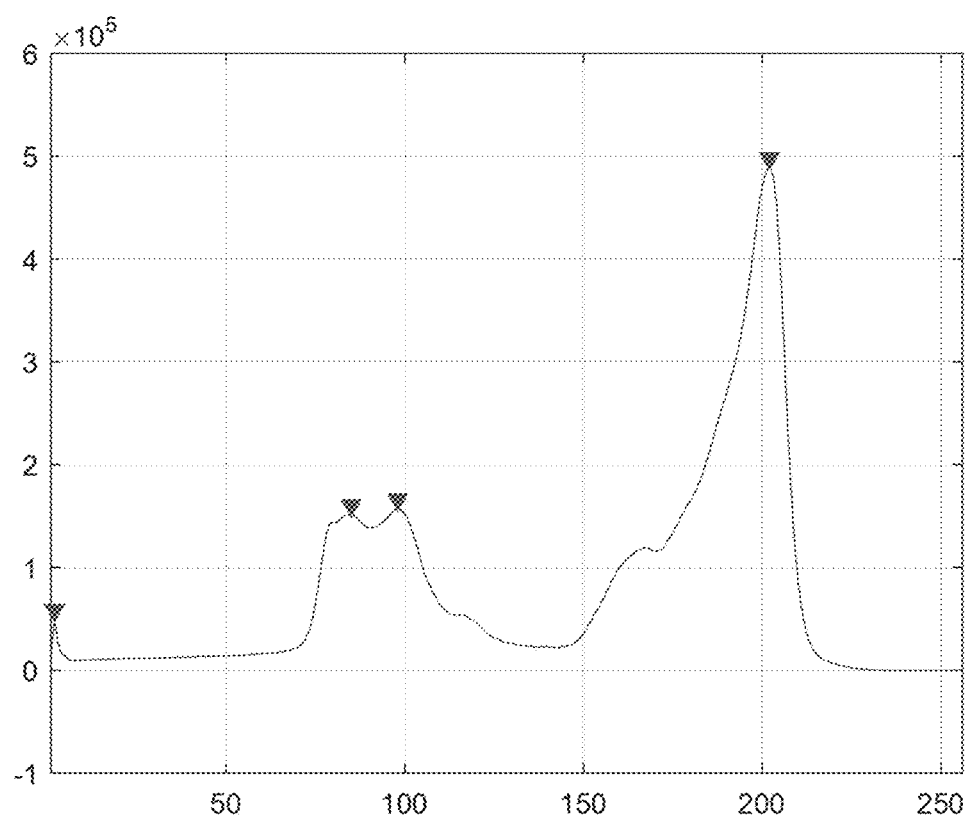
FIG. 6 is a schematic diagram of a convex height calculating example of a histogram statistics curve in an embodiment of the present disclosure.
Figure 7:
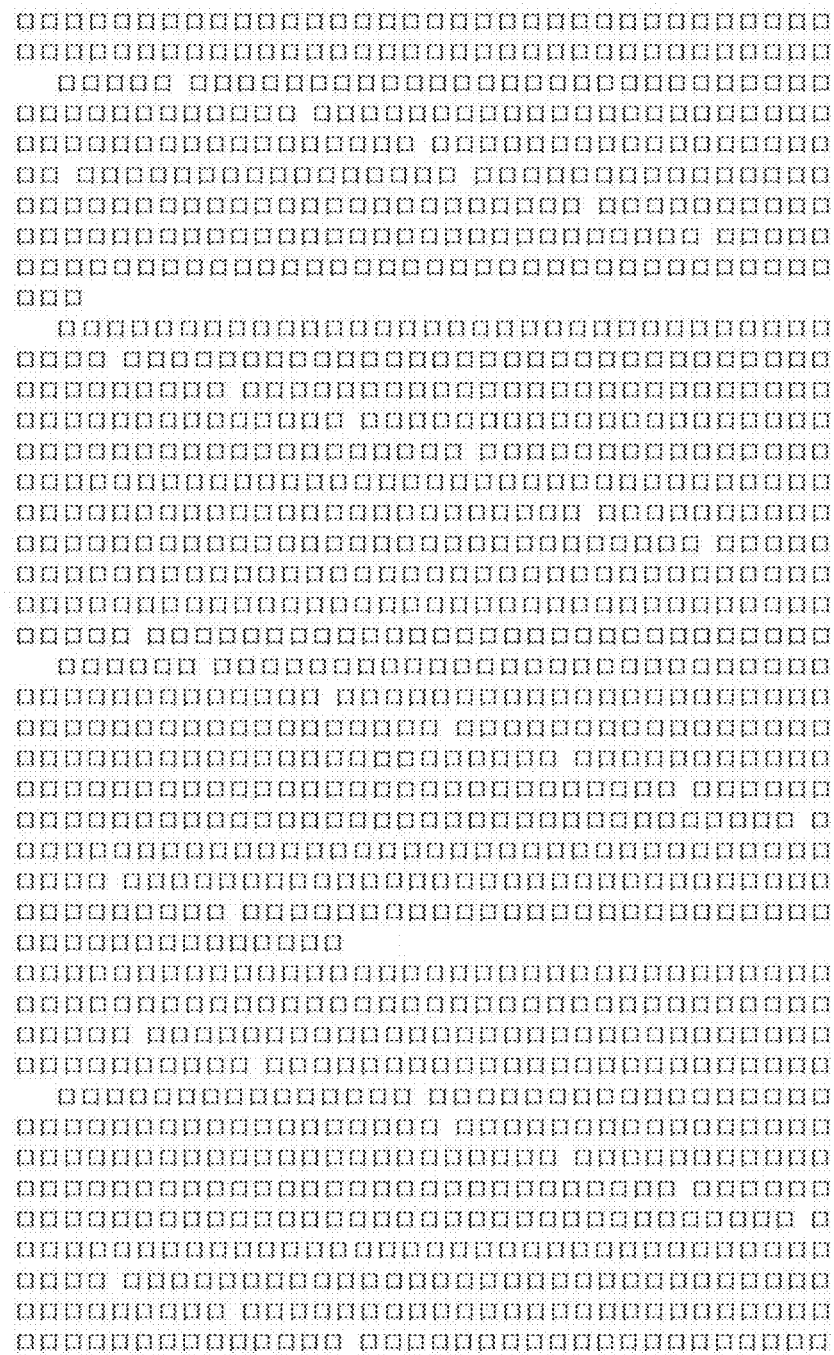
FIG. 7 is a schematic diagram of a result of eliminating a shadow area in an embodiment of the present disclosure.

According to the above Steps S301-S310, simulation processing is performed in the embodiments of the present disclosure, with the process being as follows:

as shown in FIG. 1 and FIG. 4, in a case where there is a single light source for illumination indoors, and the flashlight of the shooting equipment is not turned on, there is a large block of shadow area on the image. Characters in the shadow areas have been illegible. If the original image is directly subjected to binarization, as shown in FIG. 2, character information in the shadow area is lost completely. According to the embodiment provided by the present disclosure, histogram statistics is performed first on the grayscale image. Then the convex height of each grayscale interval is calculated. As shown in FIG. 6, four grayscale intervals with the maximum convex height are extracted as a grayscale reference value for characters and background in a subsequent shadow area. Then, through threshold segmentation, spatial smooth filtering and binarization of the grayscale value, the mask representations of the shadow area and the non-shadow area are respectively acquired. Finally, the shadow area with background enhancement and the non-shadow area of the original grayscale image are fused based on the mask representations, and the integral grayscale balance is balanced by binarization to finally obtain the text image without the shadow. Processed by the method embodiment, as shown in FIG. 7, the shadow area is substantially eliminated, and the characters are not destroyed apparently and are even more clearly visible than those in FIG. 2.

Figure 8:
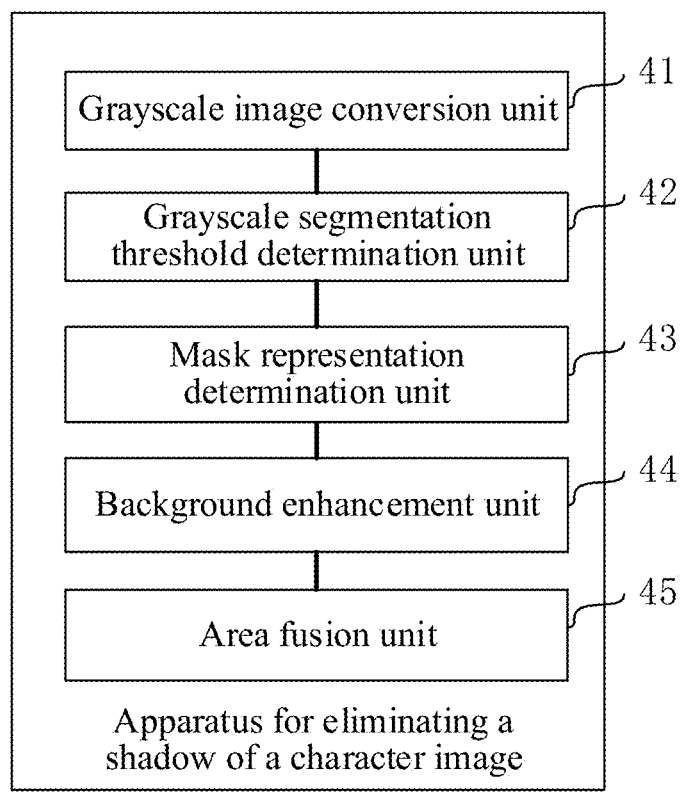
FIG. 8 is a schematic structural diagram of an apparatus for eliminating a shadow of a text image provided by an embodiment of the present disclosure.

In addition, as shown in FIG. 8, the embodiment of the present disclosure further provides an apparatus for eliminating a shadow of a text image, including:

a grayscale image conversion unit 41, configured to convert a text image to be processed into a first grayscale image;

a grayscale segmentation threshold determination unit 42, configured to perform histogram statistics and convex height sequencing processing on the first grayscale image to determine a background grayscale segmentation threshold of the first grayscale image and a character grayscale segmentation threshold within a shadow area of the first grayscale image;

a mask representation determination unit 43, configured to process the background grayscale segmentation threshold and the character grayscale segmentation threshold to respectively acquire a mask representation of the shadow area and a mask representation of a non-shadow area;

a background enhancement unit 44, configured to perform background enhancement on the first grayscale image to obtain a second grayscale image; and an area fusion unit 45, configured to perform fusion processing on the shadow area with the background enhancement in the second grayscale image and the non-shadow area in the first grayscale image according to the mask representation of the shadow area and the mask representation of the non-shadow area to acquire a text image without the shadow.

In addition, the embodiment of the present disclosure further provides an electronic device, including a processor and a memory, where the processor is coupled with the memory to execute a program or an instruction in the memory, such that the electronic device implements the method shown in the above FIG. 3 or FIG. 5.

Figure 9:
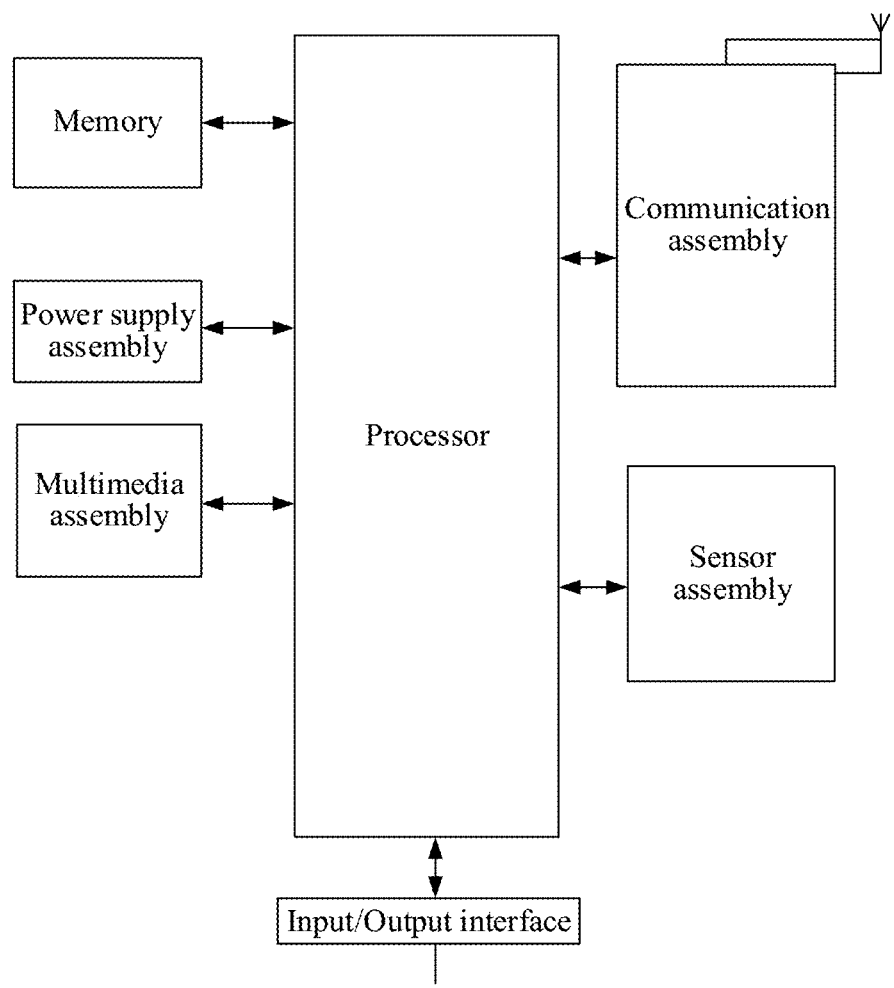
FIG. 9 is an example diagram of an electronic device for implementing an embodiment of the present disclosure.

As shown in FIG. 9, the electronic device at least includes the processor and the memory and may further include a communication assembly, a sensor assembly, a power supply assembly, a multimedia assembly and an input/output interface according to actual needs. The memory, the communication assembly, the sensor assembly, the power supply assembly, the multimedia assembly and the input/output interface all are connected to the processor. The memory may be a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and the like, and the processor may be a central processing unit (CPU), a graphics processing unit (GPU), a field-programmable gate array (FPGA), an application-specific integrated circuit (ASIC), a digital signal processing (DSP) chip, and the like. Other communication assemblies, sensor assemblies, power supply assemblies, multimedia assemblies, and the like may be implemented by universal parts, which are not specifically described herein.

In addition, the embodiment of the present disclosure further provides a computer readable storage medium, having an instruction stored therein. When the instruction runs on a computer, it enables the computer to implement the method shown in the above FIG. 3 or FIG. 5.

In addition, the embodiment of the present disclosure further provides a computer program product including an instruction. When the computer program product runs on a computer, it enables the computer to implement the method shown in the above FIG. 3 or FIG. 5.

According to the method and apparatus for eliminating a shadow of a text image, and an electronic device provided by the present disclosure, the method includes the following steps: converting a text image to be processed into a first grayscale image; performing histogram statistics and convex height sequencing processing on the first grayscale image to determine a background grayscale segmentation threshold of the first grayscale image and a character grayscale segmentation threshold within a shadow area of the first grayscale image; processing the background grayscale segmentation threshold and the character grayscale segmentation threshold to respectively acquire a mask representation of the shadow area and a mask representation of a non-shadow area; performing background enhancement on the first grayscale image to obtain a second grayscale image; and performing fusion processing on the shadow area with the background enhancement in the second grayscale image and the non-shadow area in the first grayscale image according to the mask representation of the shadow area and the mask representation of the non-shadow area to acquire a text image without the shadow. According to the embodiments of the present disclosure, the text image without the shadow may be acquired, and a condition that the partial content of the text image occluded by the shadow is lost completely is avoided, so that the reading effect when the text image is browsed and printed out is improved.

The method and apparatus for eliminating a shadow of a text image, and the electronic device provided by the present disclosure are described in detail above. Any apparent alteration made on the present disclosure by those of ordinary skill in the art without departing from the substantive content of the present disclosure shall fall into the scope of the protection of the patent right of the present disclosure.

What is claimed is:

1. A method for eliminating a shadow of a text image, comprising the following steps:
    converting a text image to be processed into a first grayscale image;
    performing histogram statistics and convex height sequencing processing on the first grayscale image to determine a background grayscale segmentation threshold of the first grayscale image and a character grayscale segmentation threshold within a shadow area of the first grayscale image;
    processing the background grayscale segmentation threshold and the character grayscale segmentation threshold to respectively acquire a mask representation of the shadow area and a mask representation of a non-shadow area;
    performing background enhancement on the first grayscale image to obtain a second grayscale image; and
    performing fusion processing on the shadow area with the background enhancement in the second grayscale image and the non-shadow area in the first grayscale image according to the mask representation of the shadow area and the mask representation of the non-shadow area to acquire a text image without the shadow.

2. The method for eliminating a shadow according to claim 1, wherein before the step of converting a text image to be processed into a first grayscale image, the method comprises the following steps:
    acquiring at least one text image, and determining information of the shadow area of each text image; and
    screening out the text image to be processed from the at least one text image according to the information of the shadow area of each text image.

3. The method for eliminating a shadow according to claim 2, wherein the step of screening out the text image to be processed from the at least one text image according to the information of the shadow area of each text image comprises the following substep:
    screening a text image with an area of the shadow area greater than a preset area threshold from the at least one text image as the text image to be processed according to the area of the shadow area of each text image.

4. The method for eliminating a shadow according to claim 2, wherein the step of screening out the text image to be processed from the at least one text image according to the information of the shadow area of each text image comprises the following substep:
    screening a text image with an area proportion greater than a preset proportion threshold from the at least one text image as the text image to be processed according to the area proportion of the shadow area of each text image in the whole image.

5. The method for eliminating a shadow according to claim 1, wherein the step of performing histogram statistics and convex height sequencing processing on the first grayscale image to determine a background grayscale segmentation threshold of the first grayscale image and a character grayscale segmentation threshold within a shadow area of the first grayscale image comprises the following substeps:

performing histogram statistics on the first grayscale image;

calculating the convex height of each grayscale interval after histogram statistics, and sequencing the convex heights; and extracting n grayscale intervals with the maximum convex height, and determining the background grayscale segmentation threshold of the first grayscale image and the character grayscale segmentation threshold within the shadow area of the first grayscale image, wherein n is a preset positive integer.

6. The method for eliminating a shadow according to claim 5, wherein the step of performing histogram statistics on the first grayscale image comprises the following substeps:

performing distribution estimation on all elements in the first grayscale image by way of histogram statistics to form a distribution estimation sequence $\overline{\lambda}$, and determining a distribution probability density $\lambda_k$ corresponding to each element in the distribution estimation sequence $\overline{\lambda}$, wherein $$\lambda_k = \frac{\theta_k}{\Theta};$$

wherein $\lambda_k$ is the distribution probability density corresponding to the $k^{th}$ element of the distribution estimation sequence $\overline{\lambda}$; $\theta_k$ is a value falling into an interval $[(k-1)*\rho, k*\rho]$; $\theta$ is the number of elements of the first grayscale image; and $\rho$ is a statistical interval, $\rho=255/Z$, and $Z$ is the total number of preset statistical intervals;

acquiring a first-order difference symbol sequence $\overline{\lambda}^{1D}$ by using a first-order difference and symbol judgment method according to the distribution probability density $\lambda_k$ corresponding to each element, wherein $\lambda_i^{1D}$ is the $i^{th}$ element of $\overline{\lambda}^{1D}$; wherein; and $$\lambda_i^{1D} = \begin{cases} 1 & \text{if } \lambda_{i+1} > \lambda_i \\ 0 & \text{if } \lambda_{i+1} = \lambda_i \quad 0 \le i \le Z-2 \\ -1 & \text{if } \lambda_{i+1} < \lambda_i \end{cases}$$

calculating a second-order difference extremum marking sequence $\overline{\lambda}^{2D}$ according to an element $\lambda_i^{1D}$ in $\overline{\lambda}^{1D}$, wherein $\lambda_j^{2D}$ is the $j^{th}$ element of $\overline{\lambda}^{2D}$; wherein $$\lambda_j^{2D} = \begin{cases} 1 & \text{if } \lambda_{j+1}^{1D} - \lambda_j^{1D} < 0 \\ 0 & \text{otherwise} \end{cases}.$$

7. The method for eliminating a shadow according to claim 6, wherein the step of calculating the convex height of each grayscale interval after histogram statistics, and sequencing the convex heights comprises the following substeps:

determining a convex height sequence H corresponding to the distribution estimation sequence $\overline{\lambda}$, wherein the length of the convex height sequence H is identical to the second-order difference extremum marking sequence $\overline{\lambda}^{2D}$ of the distribution estimation sequence $\overline{\lambda}$, and in a position where the sequence $\overline{\lambda}^{2D}$ is zero, a value corresponding to the convex height sequence H is zero, too;

calculating a convex interval and the convex height corresponding to an element $\overline{\lambda}$ at a non-zero position of the second-order difference extremum marking sequence in the distribution estimation sequence $\overline{\lambda}$, wherein calculation of the convex interval comprises calculation of a left convex interval and a right convex interval; the left convex interval is a position from an extremum position to the last higher extremum or a signal initial position; and the right convex interval is a position from the extremum position to a next higher extremum or a signal end position;

for the element $\lambda_t$ with the value of the second-order difference extremum marking sequence at the corresponding position of the element being non-zero, $0 \le t \le Z-2$, calculation modes of the initial position $\alpha_L$ of the left convex interval and the end position $\alpha_R$ of the right convex interval are as follows:

$$\alpha_L = \begin{cases} \arg_{\varphi_L}^{min}|\varphi_L - t| & \text{if } \exists \varphi_L \in [0, t), \text{ and } \lambda_{\varphi_L} > \lambda_t \\ 0 & \text{otherwise} \end{cases}$$

$$\alpha_R = \begin{cases} \arg_{\varphi_R}^{min}|\varphi_R - t| & \text{if } \exists \varphi_R \in (t, Z-2], \text{ and } \lambda_{\varphi_R} > \lambda_t \\ Z-2 & \text{otherwise} \end{cases}$$

determining the left convex interval and the right convex interval of the element $\lambda_t$ with the value of the second-order difference extremum marking sequence at the corresponding position of the element being non-zero as $[\alpha_L, t]$ and $[t, \alpha_R]$, respectively;

calculating the greater value of the minimum values within the left convex interval and the right convex interval as a reference point $\lambda_{ref}$ of the convex height:

$$\lambda_{ref} = \max\left(\min\left(\bigwedge_{h=\alpha_L}^{t-1} \lambda_h\right), \min\left(\bigwedge_{h=t+1}^{\alpha_R} \lambda_h\right)\right)$$

wherein an operator $\min(\Lambda_a^b \psi)$ is to solve the minimum value of the sequence $\psi$ in the interval $[a, b]$;

determining the convex height corresponding to the element $\lambda_t$:

$$H_t = \lambda_t - \lambda_{ref}$$

and sequencing the convex height sequence H.

8. The method for eliminating a shadow according to claim 7, wherein the step of extracting n grayscale intervals with the maximum convex height, and determining the background grayscale segmentation threshold of the first grayscale image and the character grayscale segmentation threshold within the shadow area of the first grayscale image comprises the following substep:

extracting n elements from the greatest to the least from the convex height sequence H, with corresponding indexes being $\{\tau_0, \tau_1, \tau_2, \ldots, T\tau_{n-1}\}$ in sequence, respectively extracting values at the corresponding positions of the distribution estimation sequence $\overline{\lambda}$, and determining the background grayscale segmentation threshold $\mu_b$ of the first grayscale image and the character grayscale segmentation threshold $\mu_{st}$ within the shadow area of the first grayscale image; wherein $$\begin{cases} \mu_b = \lambda_{\tau_0} - \Delta \\ \mu_{st} = \lambda_{\tau_{n-1}} + \Delta \end{cases}$$

and wherein $\Delta$ is a preset offset of the segmentation threshold.

9. The method for eliminating a shadow according to claim 8, wherein the step of performing background enhancement on the first grayscale image to obtain a second grayscale image comprises the following substep:

determining a second grayscale image $D_{st}^g$ with the background enhancement and characters reserved in the shadow area, wherein, $$d_{st,(i,j)}^g = \begin{cases} \lambda_{\tau 0} & \text{if } d_{(i,j)}^g > \mu_{st} \\ d_{(i,j)}^g & \text{otherwise} \end{cases}$$

and wherein $d_{st,(i,j)}^g$, and $d_{(i,j)}^g$ are respectively elements in the $i^{th}$ row and $j^{th}$ column of the second grayscale image $D_{st}^g$ and the first grayscale image $D^g$.

10. The method for eliminating a shadow according to claim 9, further comprising the following substep:

performing shadow boundary enhancement on the first grayscale image to obtain a third grayscale image $D_b^g$ wherein, $$d_{b,(i,j)}^g = \begin{cases} 0 & \text{if } d_{(i,j)}^g < \mu_b \\ d_{(i,j)}^g & \text{otherwise} \end{cases}$$

and wherein $d_{b,(i,j)}^g$ is the element in the $i^{th}$ row and $j^{th}$ column of the third grayscale image $D_b^g$.

11. The method for eliminating a shadow according to claim 10, wherein the step of processing the background grayscale segmentation threshold and the character grayscale segmentation threshold to respectively acquire a mask representation of the shadow area and a mask representation of a non-shadow area comprises the following substeps:

performing smooth filtering processing of a spatial domain on the third grayscale image, and then performing binarization processing to obtain the mask representation of the non-shadow area; and turning the grayscale value of the mask representation of the non-shadow area to acquire the mask representation of the shadow area.

12. The method for eliminating a shadow according to claim 11, wherein the step of performing fusion processing on the shadow area with the background enhancement in the second grayscale image and the non-shadow area in the first grayscale image according to the mask representation of the shadow area and the mask representation of the non-shadow area to acquire a text image without the shadow comprises the following substep:

performing fusion processing on the shadow area with the background enhancement in the second grayscale image and the non-shadow area in the first grayscale image to acquire the text image without the shadow.

13. An electronic device, comprising a processor and a memory, wherein the processor is coupled with the memory to execute a program or an instruction in the memory, such that the electronic device implements the method for eliminating a shadow according to claim 1.

14. An apparatus for eliminating a shadow of a text image, comprising:

a grayscale image conversion unit, configured to convert a text image to be processed into a first grayscale image;

a grayscale segmentation threshold determination unit, configured to perform histogram statistics and convex height sequencing processing on the first grayscale image to determine a background grayscale segmentation threshold of the first grayscale image and a character grayscale segmentation threshold within a shadow area of the first grayscale image;

a mask representation determination unit, configured to process the background grayscale segmentation threshold and the character grayscale segmentation threshold to respectively acquire a mask representation of the shadow area and a mask representation of a non-shadow area;

a background enhancement unit, configured to perform background enhancement on the first grayscale image to obtain a second grayscale image; and an area fusion unit, configured to perform fusion processing on the shadow area with the background enhancement in the second grayscale image and the non-shadow area in the first grayscale image according to the mask representation of the shadow area and the mask representation of the non-shadow area to acquire a text image without the shadow.

* * * * *